(No Model.)

J. BURNS.
FRUIT CUTTING MACHINE.

No. 466,453. Patented Jan. 5, 1892.

Witnesses:
J. D. Garfield
A. D. Porter

Inventor,
John Burns
by Chapin & Co.
Attorneys.

UNITED STATES PATENT OFFICE.

JOHN BURNS, OF LOS ANGELES, CALIFORNIA.

FRUIT-CUTTING MACHINE.

SPECIFICATION forming part of Letters Patent No. 466,453, dated January 5, 1892.

Application filed July 20, 1891. Serial No. 400,026. (No model.)

*To all whom it may concern:*

Be it known that I, JOHN BURNS, a citizen of the United States, residing at Los Angeles, in the county of Los Angeles and State of California, have invented new and useful Improvements in Fruit-Cutting Machines, of which the following is a specification.

This invention relates to improvements in machines for opening fruit, the principal design being to provide means or mechanism for receiving, supporting, and conveying the fruit—such, for instance, as apricots, peaches, or the like—and bringing and subjecting them to the cutting action of knives, the same cutting the fruit in two; but when the fruit comprises a stone the knives are to yield upon the latter, and the cleft fruit is then delivered upon a suitable tray or receiver therefor, when the stones may be readily removed by hand.

The invention is particularly advantageous for preparing the fruit for drying or canning or preserving; and the invention consists in the construction and combination or arrangement of parts and contrivances, all substantially as will hereinafter more fully appear, and be set forth in the claims.

Figure 1:
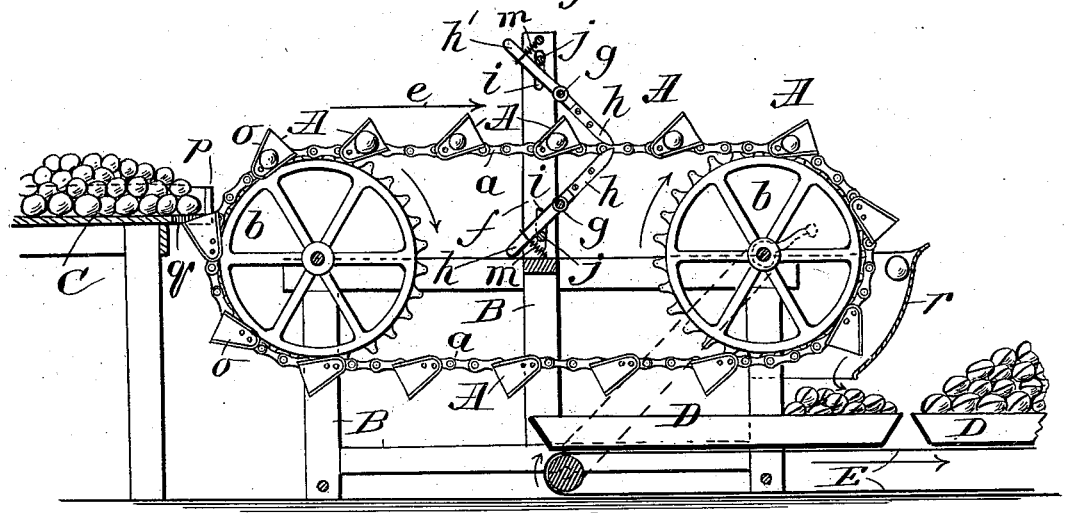
Figure 2:
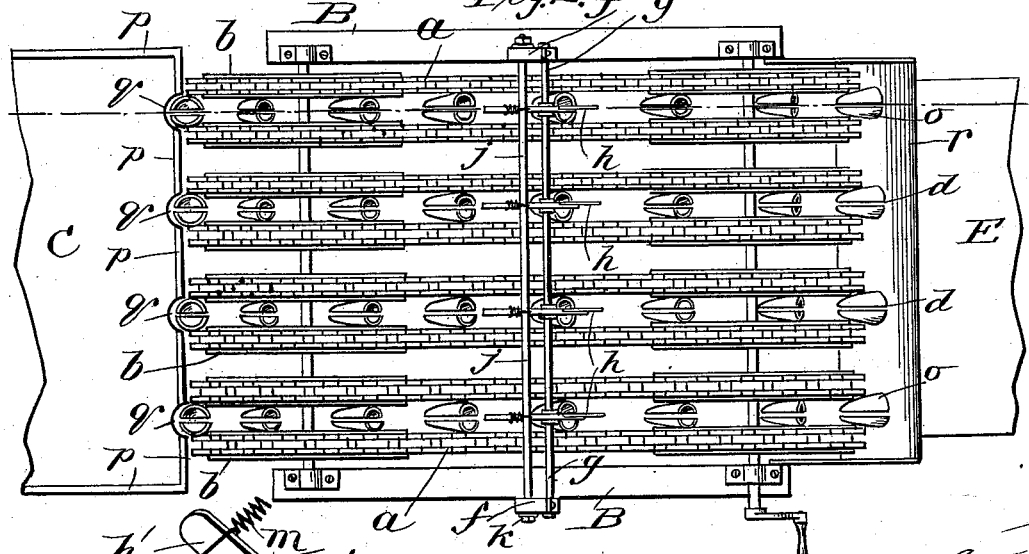
Figures 3, 4:
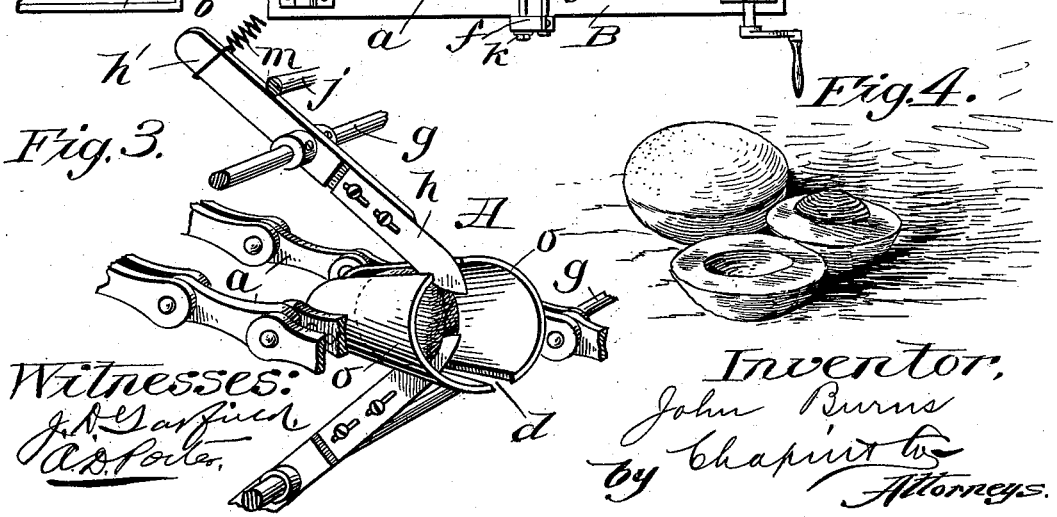

Reference is to be had to the accompanying drawings, in which an embodiment of the invention is shown, Figure 1 being a sectional elevation of the machine, and Fig. 2 is a plan view of the same. Fig. 3 is a perspective view of the cleft cup and a part of its carrier, shown as in working relation to the knife. Fig. 4 is a picture of a whole fruit and one as cleft by the machine.

Similar letters of reference indicate corresponding parts in all of the views.

A A represent the receptacle-conveyers for the fruit, the same consisting of devices which are of bell or cup shape cleft by a slot or opening $d$ coincident with the axis, and each section, separated by and at each side of the slot or opening, is confined or supported on a sprocket-chain $a$ therefor, the several chains for the several series of half-cups, as shown, being mounted on sprocket and supporting wheels $b$ $b$, certain of which wheels are to receive rotary motion through means of a crank or other usual or proper device.

As shown in the drawings, the separated shells $o$ $o$, successively mounted on a pair of the parallel chains, have their separating spaces or slots $d$ in a common vertical plane, which is coincident with the line of travel of the chain, and each of the cupped receivers has its flaring mouth upwardly and forwardly extended, as indicated in Fig. 1, the arrow $e$ indicating the direction of the travel.

The frame B of the machine, which may be of any appropriate form or design, comprises the intermediate side standards $f$, on which the transverse rods $g$ are supported above and below the upper courses of chain, and on the rods $g$ for each set of receptacle fruit-conveyers is a pair of knives or cutters $h$, the same being by their holders or shanks intermediately pivoted on the supporting-rod $b$ and inclined one downwardly and forwardly and the other upwardly and forwardly, the points of the blades terminating in proximity, substantially as shown, and the blades are in the plane of the separating opening or cleft to the conveyer-shelf. The uprights $f$ support the transverse rods $j$, which are vertically adjustable in the slots $i$ and held or bound to confinement by the nuts $k$, and said rods constitute adjustable stops, against which the knife-extensions $h'$ are normally forced to bearing by the springs $m$. The springs maintain the knives with their blade ends in proximity, as desired, the slight degree of separation thereat being regulated by the positions of the stop-rods $j$ $j$. The knife-blades are adjustable longitudinally on their holders, whereby they may be forwardly moved to compensate for wear.

C represents a work-table at the rear end of the machine of a width more or less nearly corresponding to the space occupied by the four sets of chain-carried conveyers, and the forward edge of the said table, which preferably is provided with the board or ledge $p$, has the openings through the ledge and the front of the table-top adjoining the same, as indicated at $q$, so that the carriers which move on the under course of the chain rearwardly and then upwardly may pass through said openings without impediment by the edge portion of the work-table, and as the upwardly-moving conveyer-cups are about to reach the surface of the table the apricots or other fruit are deposited one in each of the shells when in their forward travel they are brought to the knives, and the same of course cleaves them; but when the stones are forced against the knife-edges as the fruit is carried forward the knives recede accordingly, closing together again on the rear converging portion of the stone and completing the separation of the fruit. If the fruit is stoneless, of course there will be nothing to cause the knife to recede, and the fruit will be halved. The conveyer-cups reaching the end of the machine and being carried downwardly on the sprocket or supporting-wheel of course permit and insure the discharge of the split fruit, which by gravity falls therefrom onto the guide-chute r, and thence moves to the tray D.

E represents a part of an endless apron on which more than one tray may be supported, so that, due to the movement of the trays with the apron as the machine is operated, a more or less automatic distribution of the delivered fruit may be secured thereon. An attendant may now readily lay the halves of the fruit open and more properly spread them on the tray, at the same time picking out the stones; and it will be clear that the machine constructed and arranged substantially as described and shown, has the capacity, on being fed with the whole fruit at one end, of greatly facilitating the work of opening, this function being performed in an efficient manner and on an extensive scale as compared with the hand process, so far as known to me.

Of course certain departures in details of construction may be made from those illustrated without departing from the spirit of my invention, and,

Having now described substantially the composition of the apparatus and in what manner it may be made available by those skilled in the art to which it appertains, I claim and desire to secure by Letters Patent—

1. In a fruit-cutting machine, a series of paired separated shells or sections, which together conduce to form holder-cups, carriers for said sections having uniform movements, the said shells being so arranged on their carriers that their mouths are forwardly disposed relative to their direction of travel, and one or more knives having their blades located in the plane of the split between the cups, substantially as described.

2. In a fruit-cutting machine, a series of paired separated shells or sections which together conduce to form holder-cups, carriers for said sections having uniform movements, the said shells being arranged on their carriers with their open portions forwardly disposed relative to their direction of travel, and one or more knives located with their blades in the plane of separation and which are spring-pressed to be maintained in their normal positions and adapted to have receding movements in the said plane of separation, substantially as described.

3. In combination, in a fruit-cutting machine, a pair of carrier-chains arranged side by side and supporting and propelling wheels therefor, and the opposing separated cup-shells on said chains, which have their open portions forwardly and upwardly disposed relative to the upper courses of travel of the chains, the knives located in the plane of separation, and a work-table located at the end of the machine adjacent the wheels, around the outer edge of which the said cups upwardly pass with their mouths upward, substantially as and for the purposes set forth.

4. In combination, in a fruit-cutting apparatus, a pair of endless carrier-chains arranged side by side and vertical supporting and propelling wheels therefor, the opposing separated cup-shells supported by said chains, which have their open portions forwardly and upwardly disposed relative to the upper courses of travel of the chains, the knives located in the plane of separation, and a receiving-tray located below portions of those wheels at which the open mouths of the cups downwardly turn, substantially as and for the purpose described.

5. In combination, in a fruit-cutting apparatus, a work-table having the apertures in its forward edge, the carrier-chain and supporting-wheels therefor, the opposing separable cup-shells on the chain, and the knives located in the plane of separation through the cups, substantially as described.

6. In combination, in a fruit-cutting machine, the sprocket-wheels arranged in side pairs in vertical planes and having the sprocket-chains thereon, which carry paired and separated shell-sections, which relative to the courses of movement of the carrying-chains are upwardly and forwardly inclined and formed with mouths at such upper and forward ends, the knives arranged with their blades in the common plane of separation between the shell-sections, the endless apron located under the endless chains and one or more trays thereon, and the guard-chute r outside of the edges of the sprocket-wheels, down and around which the shell-sections pass, substantially as described.

7. In combination, in a fruit-cutting apparatus, split and separated conveyer-cups and carriers therefor, in combination with a knife located in the line of the split through the cups, a support on which the knife is pivotally mounted, an adjustable stop whereby the working position of the knife may be regulated and limited, and a spring applied to the knife for normally maintaining it against the stop, substantially as described.

8. In combination, the machine-frame having the standards and the several opposite end pairs of sprocket-wheels mounted thereon, several pairs of chains mounted on the sprocket-wheels and ranging in parallelism and carrying the shells, pairs of which conduce to form the conveyer-cups, which are set with their mouths forwardly and upwardly presented and having the splits or separations through them, the transverse rods $g$ and the knives intermediately pivoted thereon and arranged in the planes of the said splits, the rods $j$, adjustably supported on the uprights and acting as stops for the knives, and the springs $m\ m$, all substantially as and for the purposes set forth.

JOHN BURNS.

Witnesses:
WM. S. BELLOWS,
A. D. PORTER.